United States Patent [19]
Lin

[11] Patent Number: 5,392,666
[45] Date of Patent: Feb. 28, 1995

[54] AUTO CORRECTION DEVICE FOR WEARING END PLAY IN WORM GEAR SET

[76] Inventor: Chion-Dong Lin, No. 12-6, Tien Hsin Lane, Ya Tan Rd., Ta Ya Hsiang, Taichung Hsien, Taiwan, Prov. of China

[21] Appl. No.: 95,837

[22] Filed: Jul. 22, 1993

[51] Int. Cl.[6] ............................................. F16H 55/24
[52] U.S. Cl. ......................................... 74/427; 74/402; 74/409
[58] Field of Search ........................... 74/402, 409, 427

[56] References Cited

U.S. PATENT DOCUMENTS

| | | | |
|---|---|---|---|
| 1,274,918 | 8/1918 | Maag | 74/427 |
| 3,330,165 | 7/1967 | Ishikawa et al. | 74/427 X |

FOREIGN PATENT DOCUMENTS

| | | | |
|---|---|---|---|
| 544319 | 7/1957 | Canada | 74/427 |
| 55-60757 | 5/1980 | Japan | 74/427 |

*Primary Examiner*—Allan D. Herrmann
*Attorney, Agent, or Firm*—Bacon & Thomas

[57] ABSTRACT

An auto correction device for wearing end play in worm gear set has a correction worm gear, two linking gears and auxiliary linking gears to help power transmission in a smooth manner. The correction worm gear further includes a threaded thrust block, an auxiliary linking gear, a thrust plate, an expansion spring and a base plate. The thrust of the expansion spring against the thrust plate enables the displacement of the auxiliary linking gear and threaded thrust block to thrust against the correction worm gear to impose a force upon transmission gear to enable the transmission gear to lean tightly against the worm gear. Thus, wearing end play between the worm gear and the correction worm gear is eliminated.

4 Claims, 6 Drawing Sheets

AUTO CORRECTION DEVICE FOR WEARING END PLAY IN WORM GEAR SET

FIELD OF THE INVENTION

This invention relates to a device for improving wearing end play in a worm gear set, and particularly to an auto correction device for wearing end play in a worm gear set by means of a thrust with a correction worm gear set to eliminate play between a transmission gear and a worm gear.

BACKGROUND OF THE INVENTION

Generally speaking wear can hardly be avoided due to gears engaging rotation. Referring to FIG. 1, a conventional worm gear set is made for direct engagement of transmission gear 3 with worm gear 1. Further, transmission gear 3 is linked with output load bar 6. Such a structure has the following defects:

(1) After some period of use, a worn worm portion 4 is hence caused on toothed wall 40 of transmission gear 3 and toothed wall 49 of worm gear 1. Because toothed wall 40 and toothed wall 49 become thinner, a wider tooth valley therebetween is cause that results in excessive end play of engagement between gears 3 and 1.

(2) The equipment using the aforesaid conventional worm gear set, such as a lathe, a drilling machine, sawing machine, etc. would suffer tooling head vibration, leaping up and down, noise pollution and poor working quality. Also the use of worm gear set for transmission of a working pitch would cause poor working precision of the machine because of deviation in rotating pitch.

In view of the aforesaid defects, the inventor thus has devoted himself to research for overcoming such problems and finally has created the present auto correction device for wearing end play in a worm gear set that is able to eliminate such end play caused in worm gear set by means of an automatic correction and adjustment to ensure that a result of closely engaging rotation can be attained.

DETAILED DESCRIPTION OF PREFERRED EMBODIMENTS

Figure 1:
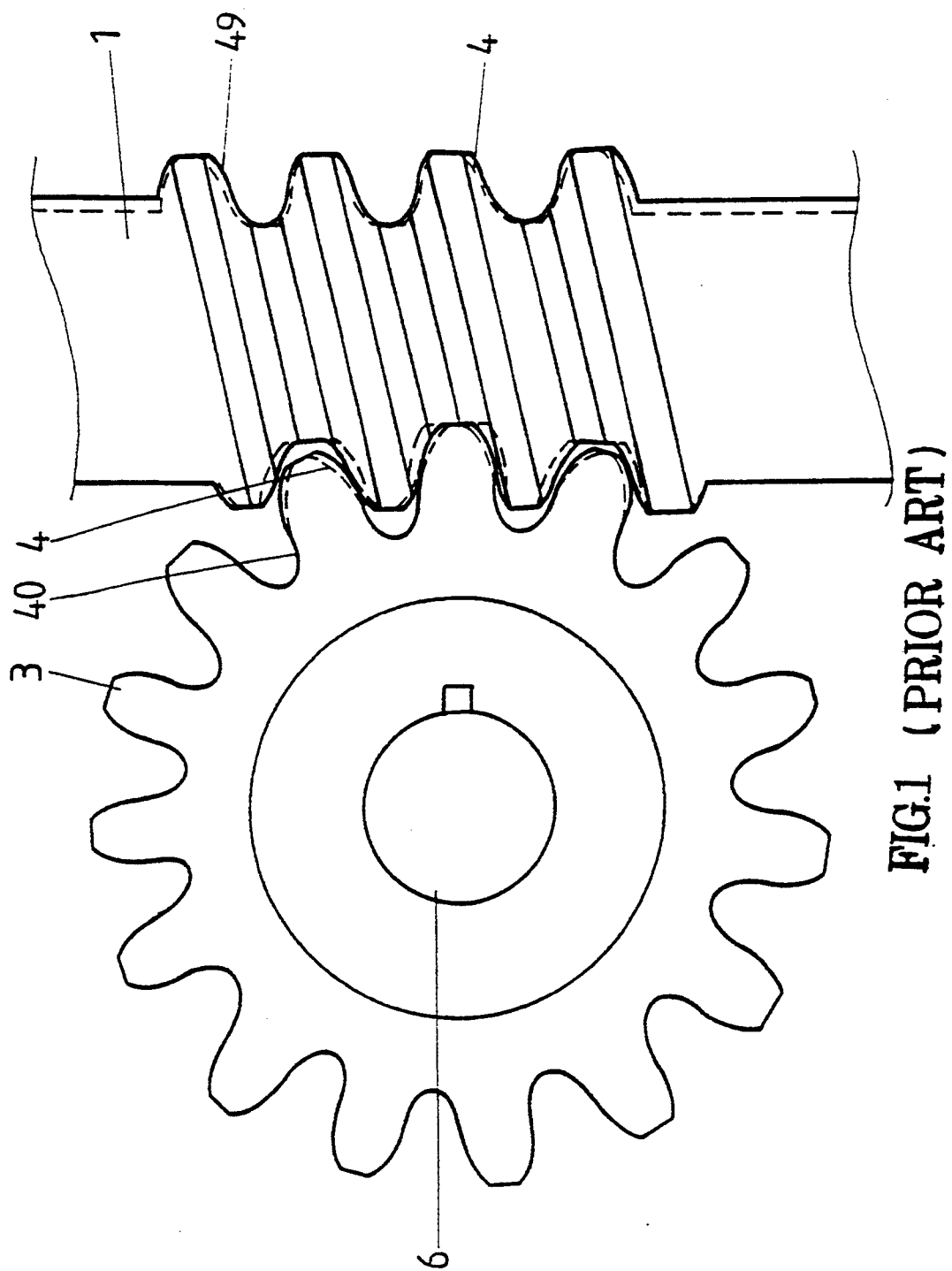
FIG. 1 is a diagrammatic view of a conventional worm gear set.
Figure 2:
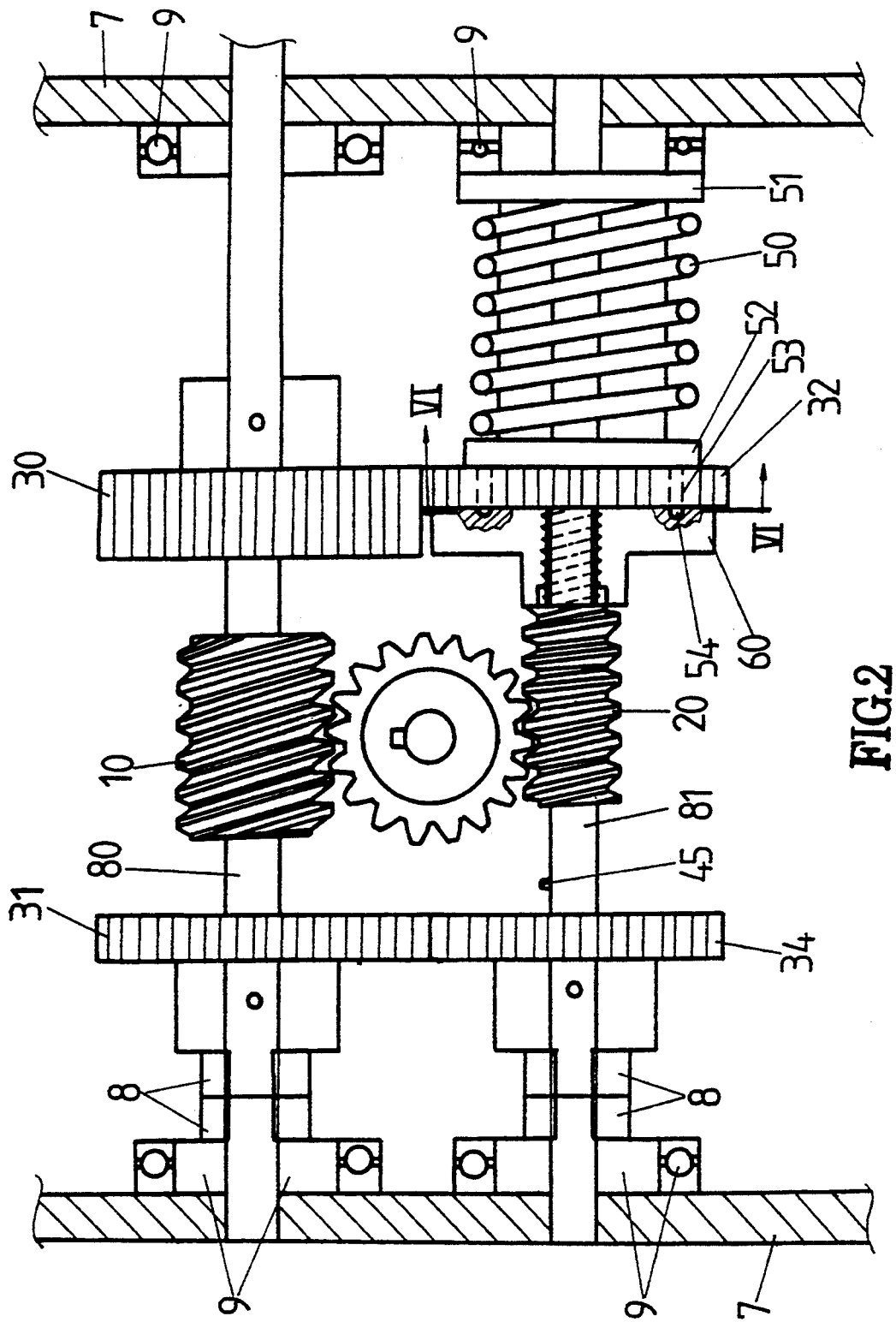
FIG. 2 is a diagrammatic view of the structure of the present invention.
Figure 3:
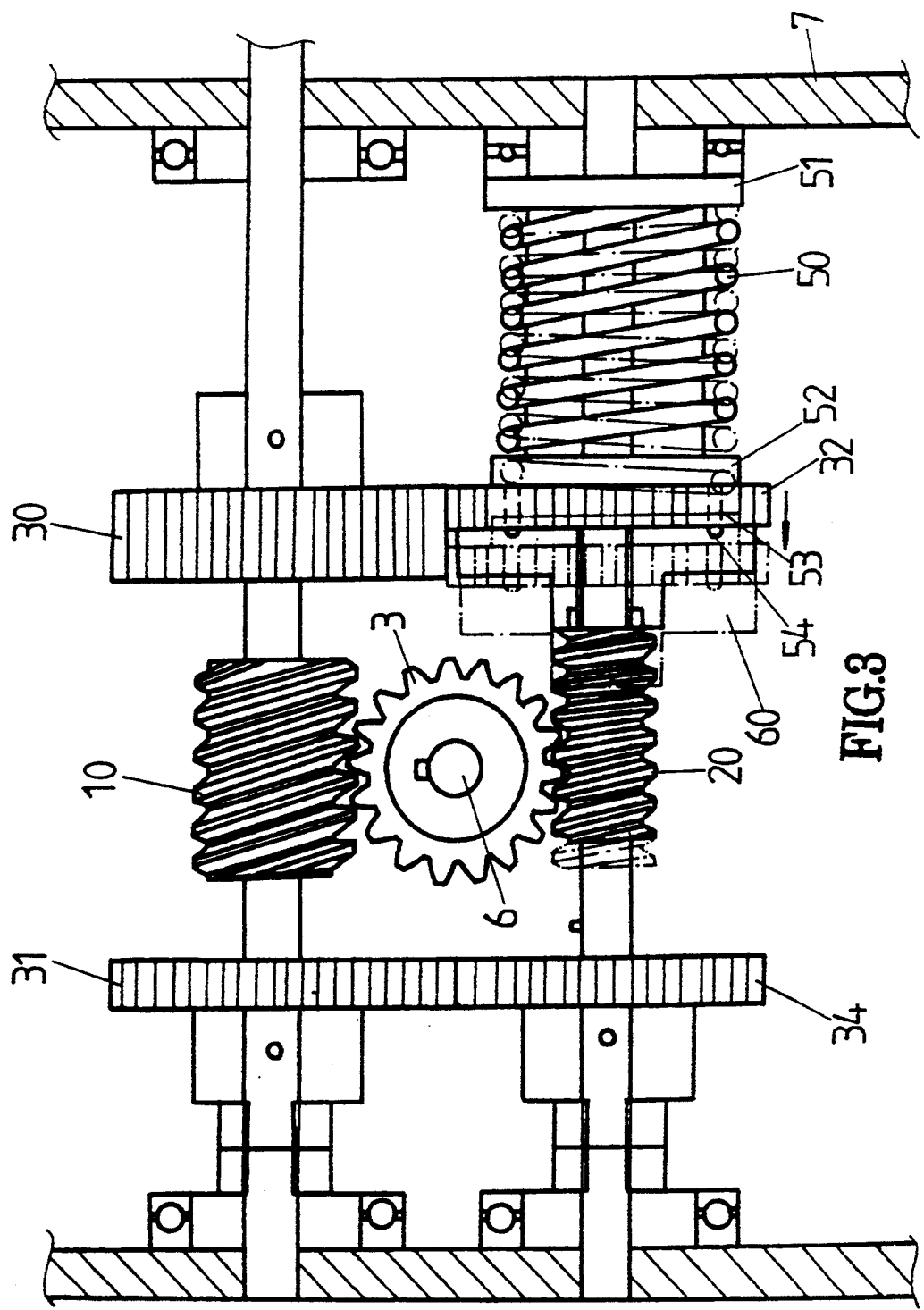
FIG. 3 is a diagrammatic view of the correction action of the present invention.
Figure 4:
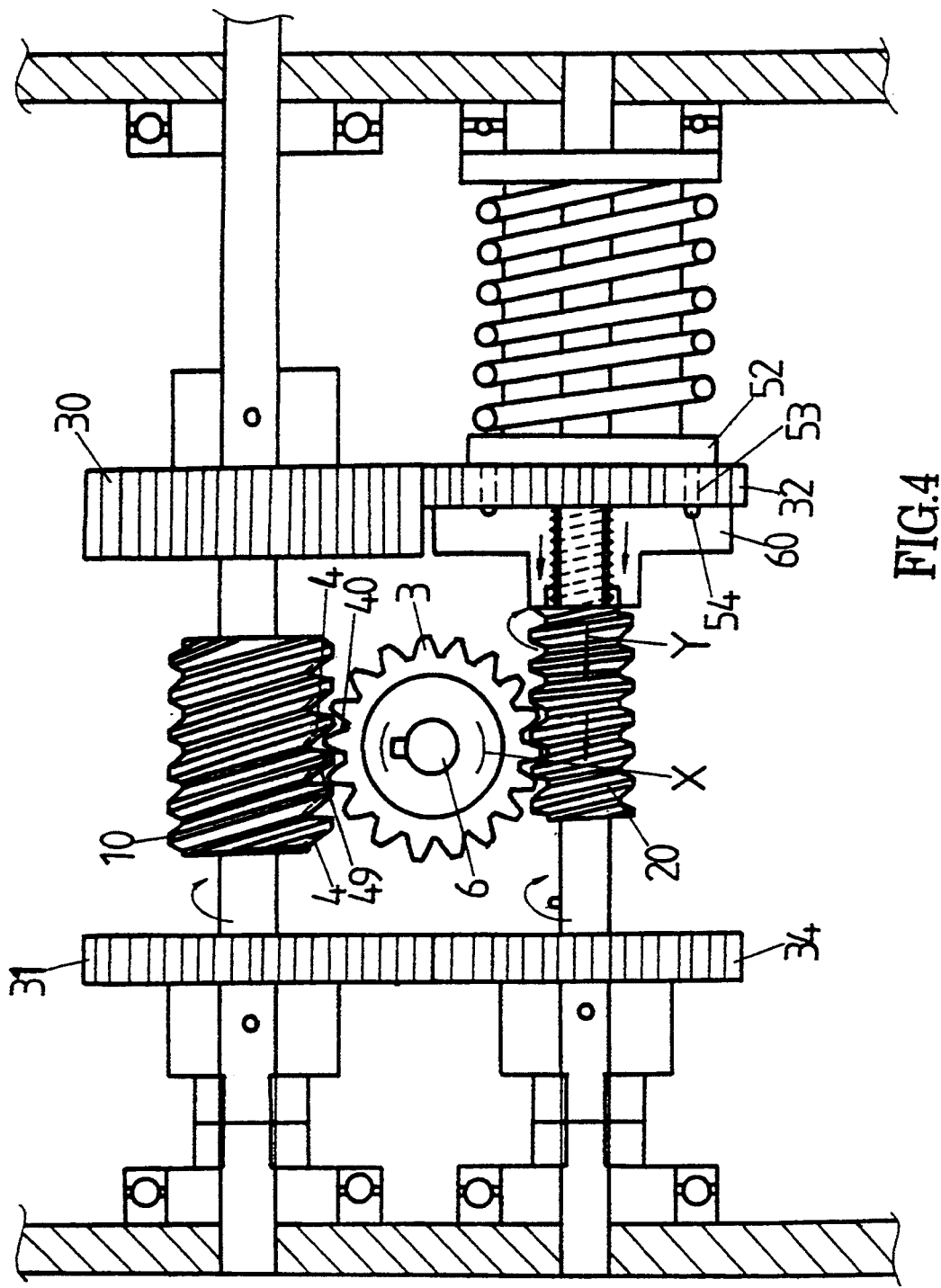
FIG. 4 is a diagrammatic view of rotation and correction force hence employed by the present invention.

Referring to FIG. 2, the present device comprises a rotating shaft 80, two Linking gears 30, 31 and auxiliary linking gears 32, 34, a transmission gear 3, a worm gear 10, a correction worm gear 20, a thrust block 60, a thrust plate 52, a expansion spring 50, a base plate 51, a plurality of bearings 9, a plurality of locating blocks 8 and limit pins 45. Rotating shaft 80 has linking gears 31, 30 and worm gear 10 in a fixed manner, wherein linking gear 30 is made greater in thickness to enable bearings 9 and locating blocks 8 to be mounted on a fixed seat 7. One end of rotating shaft 80 is connected to an external power source such as motor (not shown). Transmission gear 3 is engaged with worm gear 10 and connected to an output load bar 6. Auxiliary linking gear 34 is symmetrically engaged with linking gear 31 and secured to a linking shaft 81. Correction worm gear 20 is slidably splined on linking shaft 8 and engaged with transmission gear 3. Shaft 81 has thrust block 60, auxiliary linking gear 32, thrust plate 52, expansion spring 50, base plate 51, and such an assembly is then mounted on a fixed seat 7 by means of locating blocks 8 and bearings 9. Limit pins 45 are made to define maximum displacement of correction worm gear 20. Thrust plate 52 has an extension rod 53 passing through auxiliary linking gear 32 and fitting into an indentations 54 on threaded thrust block 60. Referring to FIGS. 3 and 4, the correction action, rotation and adjustment force employed is performed in such a manner that, worm gear 10 is made to drive transmission gear 3, linking gears 30, 31, for linking auxiliary linking gears 32 , 34, and correction worm gear 20 is hence in rotation with transmission gear 3. Because thrust block 60 is threaded onto linking shaft 81 without locking up, thrust block 60 is hence made free in displacement to push against correction worm gear 20 to produce a thrust force Y in conjunction with a rotating force X to urge toothed wall 40 of transmission gear 3 tightly against toothed wall 49 of worm gear 10, whereby end play in each engagement can be eliminated to attain the result of effective transmission without end play in engaging rotation of worm gear 10 with transmission gear 3. The fit of extension rod 53 of thrust plate 52 with indentation 54 of thrust block 60 is made to form a wrench-like effect to strengthen threading displacement of thrust block 60. For such purpose, indentations 54 must be made in quite a shallow manner and with a circular measure, and extension rod 53 must also be made with a circular measure on its end face. When correction worm gear 20 is in an appropriate place, thrust block 60 is hence prohibited from further displacement (threading), and expansion of spring 50 enables extension rod 53 to slide into/out of invertedarc groove 54 (such motion could hardly be sensed because of shallow groove designed) so as to attain the result of wrench screwing.

Figure 5:
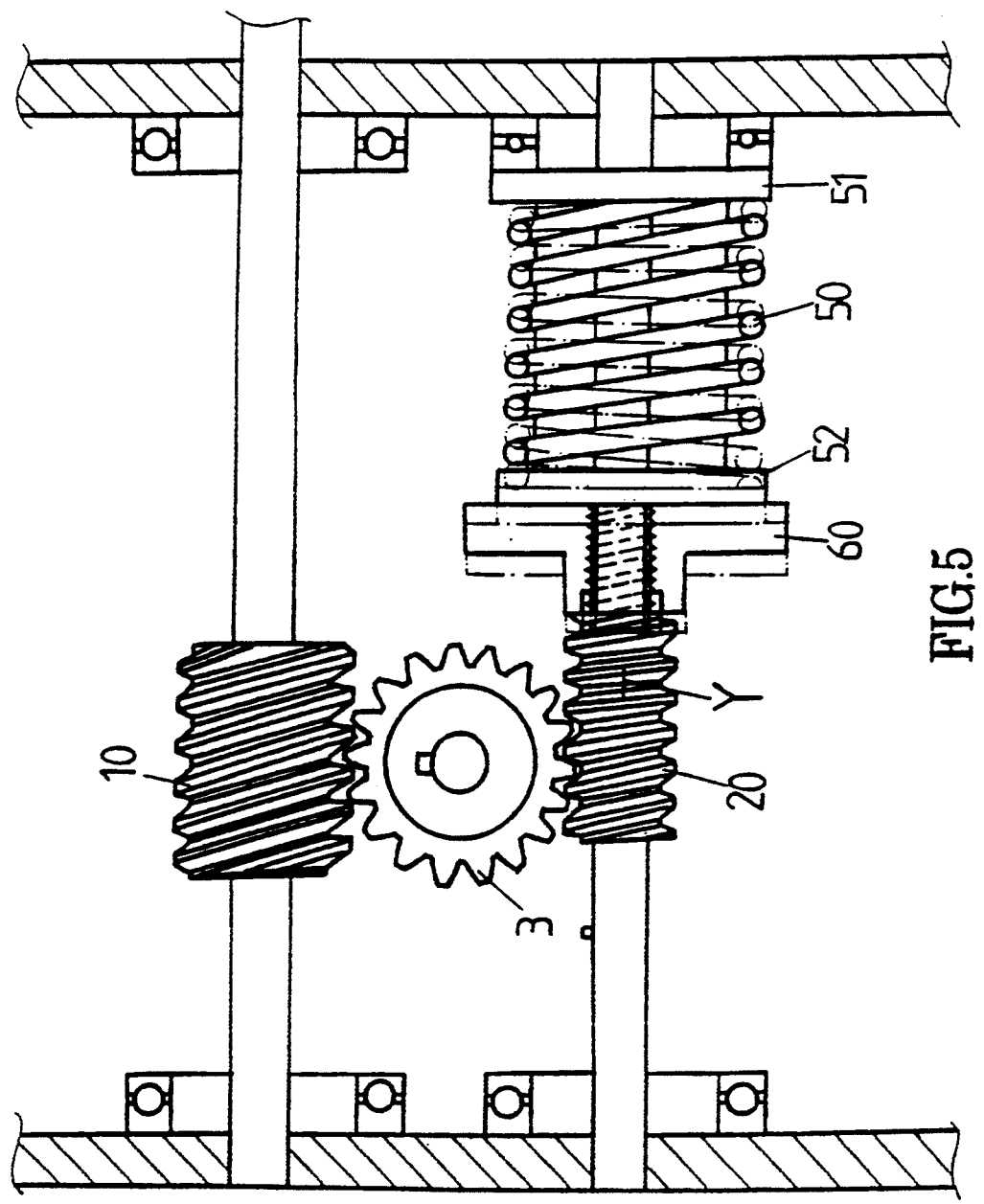
FIG. 5 is a view of an alternative embodiment of the present invention.
Figure 6:
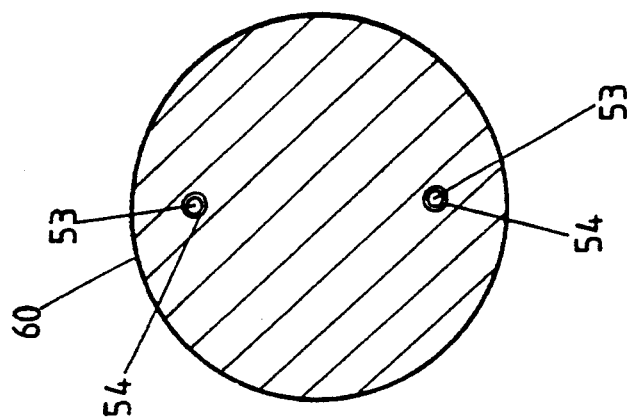
FIG. 6 is a cross-sectional view taken along line VI—VI in FIG. 2.

Referring to FIG. 5, in order to minimize production cost of parts., for a light-duty worm gearset such components as linking gears 30, 31, auxiliary linking gears 32, 34, extension rod 53 and the inverted-arc groove 54 can be omitted. While correction worm gear 20 still can be made to produce a thrust force Y against transmission gear 3 with the function of thrust block 60 and spring 50, to attain the result of correcting end play.

What is claimed is:

1. An auto correction device for correcting wearing end play in a worm gear set comprising:
   a) a first rotatable shaft having a first worm gear fixedly attached thereto so as to rotate therewith, and at least one linking gear attached to the first shaft so as to rotate therewith;
   b) a second rotatable shaft having a second worm gear slidably mounted thereon so as to rotate with the second rotatable shaft, and at least one auxiliary linking gear in engagement with the at least one linking gear, the at least one auxiliary linking gear slidably mounted on the second shaft so as to rotate therewith;

c) a transmission gear engaged with both the first and second worm gears;

d) a threaded thrust block threaded onto the second shaft in contact with an end of the second worm gear and the at least one auxiliary linking gear;

e) biasing means acting on the at least one auxiliary linking gear so as to urge the at least one auxiliary gear against the threaded thrust block; and, f) releasable drive means between the at least one auxiliary linking gear and the threaded thrust block for releasably rotating the threaded thrust block, such rotation exerting an axial force on the second worm gear so as to take up wearing end play in the worm gear set.

2. The auto correction device for correcting wearing end play in worm gear set of claim 1, wherein the at least one linking gear has a greater width than the at least one auxiliary linking gear to enable the at least one auxiliary linking gear to remain engaged with the at least one linking gear during displacement of the at least one auxiliary linking gear caused by a thrust force of the biasing means.

3. The auto correction device of claim 1 wherein the releasable drive means comprises:

a) a thrust plate located between and in contact with the biasing means and the at least one auxiliary linking gear, the thrust plate having at least one extension rod extending therefrom so as to extend through the at least one auxiliary linking gear; and, b) a plurality of indentations defined by the threaded thrust block located so as to be engaged by the at least one extension rod.

4. The auto correction device of claim 1 wherein the biasing means comprises a spring.

* * * * *